US012735344B2

(12) United States Patent
Ma et al.

(10) Patent No.: US 12,735,344 B2
(45) Date of Patent: Sep. 15, 2026

(54) PROCESS OF MAKING MULTI-CORE FIBER PREFORM BY INTEGRATING CORE RODS AND CLADDING CYLINDER

(71) Applicants: HERAEUS QUARTZ NORTH AMERICA LLC, Buford, GA (US); Heraeus Quarzglas GmbH & Co. KG, Hanau (DE)

(72) Inventors: Qiulin Ma, Buford, GA (US); Kai Huei Chang, Buford, GA (US); Kay Schuster, Hanau (DE); Michael Lorenz, Hanau (DE)

(73) Assignees: HERAEUS QUARTZ NORTH AMERICA LLC, Buford, GA (US); HERAEUS QUARZGLAS GMBH & CO. KG, Hanau (DE)

( * ) Notice: Subject to any disclaimer, the term of this patent is extended or adjusted under 35 U.S.C. 154(b) by 271 days.

(21) Appl. No.: 18/558,491

(22) PCT Filed: May 5, 2022

(86) PCT No.: PCT/US2022/072140
§ 371 (c)(1),
(2) Date: Nov. 1, 2023

(87) PCT Pub. No.: WO2022/236305
PCT Pub. Date: Nov. 10, 2022

(65) Prior Publication Data

US 2024/0217860 A1 Jul. 4, 2024

Related U.S. Application Data

(60) Provisional application No. 63/185,055, filed on May 6, 2021.

(51) Int. Cl.
*C03B 37/012* (2006.01)
*C03B 37/07* (2006.01)

(52) U.S. Cl.
CPC .. *C03B 37/01222* (2013.01); *C03B 37/01231* (2013.01); *C03B 37/01245* (2013.01);
(Continued)

(58) Field of Classification Search
None
See application file for complete search history.

(56) References Cited

U.S. PATENT DOCUMENTS

| | | | |
|---|---|---|---|
| 9,604,868 | B2 | 3/2017 | Nakanishi et al. |
| 10,378,996 | B2 | 8/2019 | Rasnik |

(Continued)

FOREIGN PATENT DOCUMENTS

| | | | |
|---|---|---|---|
| EP | 1002249 | A1 | 5/2000 |
| EP | 2320256 | A1 | 5/2011 |

(Continued)

*Primary Examiner* — Lisa L Herring
(74) *Attorney, Agent, or Firm* — Panitch Schwarze Belisario & Nadel LLP

(57) ABSTRACT

A process for manufacturing an MCF preform having a center longitudinal axis, a plurality of core rods each positioned in a respective core hole and extending along the axis, and a common cladding covering each of the plurality of core rods. The process includes the following steps. A cylinder is provided which will form the cladding of the preform and may have a center core hole. Peripheral core holes are created in the cylinder extending along the longitudinal axis. Each of a plurality of core rods is inserted into a respective peripheral core hole. The cylinder with the core rods inserted in the respective core holes is heated by exposing the cylinder and core rods to a heating element, thereby integrating the core rods and the cylinder and forming the preform, wherein the position error of the core holes with respect to the diameter of the preform is ≤0.6%.

12 Claims, 6 Drawing Sheets

(52) U.S. Cl.
CPC .... *C03B 37/01257* (2013.01); *C03B 37/0126* (2013.01); *C03B 37/07* (2013.01)

(56) References Cited

U.S. PATENT DOCUMENTS

| | | | | |
|---|---|---|---|---|
| 10,590,022 | B2 | 3/2020 | Fattal et al. | |
| 2010/0326139 | A1* | 12/2010 | Sugizaki | C03B 37/01234 65/412 |
| 2016/0229733 | A1 | 8/2016 | Nakanishi et al. | |
| 2018/0145752 | A1 | 5/2018 | Ma et al. | |
| 2020/0223737 | A1 | 7/2020 | Ma et al. | |
| 2020/0277219 | A1* | 9/2020 | Khrapko | C03B 37/0126 |

FOREIGN PATENT DOCUMENTS

| | | | |
|---|---|---|---|
| EP | 3323791 | A1 | 5/2018 |
| JP | 2013030890 | A | 2/2013 |
| JP | 5995298 | B1 | 9/2016 |
| JP | 2016191693 | A | 11/2016 |
| JP | 2019081681 | A | 5/2019 |
| JP | 6560178 | B2 | 8/2019 |
| WO | 2016022151 | A1 | 2/2016 |
| WO | 2016118144 | A1 | 7/2016 |
| WO | 2020/176216 | A1 | 9/2020 |

* cited by examiner

TIME = 400 SURFACE: TEMPERATURE (K)

100
80
60
40
20
0
-20
-40
-60
-80
-100

-100 -50 0 50 100

$x10^3$
2.4
2.38
2.36
2.34
2.32
2.3
2.28
2.26
2.24
2.22
2.2

PROCESS OF MAKING MULTI-CORE FIBER PREFORM BY INTEGRATING CORE RODS AND CLADDING CYLINDER

FIELD

The present disclosure relates generally to the field of optical fiber technology and in particular to preforms for multi-core fibers (MCF). These fibers enable increased bit rate capacity in optical cables for telecommunication by spatial division multiplexing.

BACKGROUND

As disclosed in U.S. Patent Application Publication No. 2018/0145752 titled "Upward Collapse Process and Apparatus for Making Glass Preforms" (and related EP 3323791) and U.S. Patent Application Publication No. 2020/0223737 titled "Automated Large Outside Diameter Preform Tipping Process and Resulting Glass Preforms" filed by an assignee of the subject application, Heraeus Quarzglas GmbH & Co. KG, the field of applied science and engineering concerned with the design and application of optical fibers is known as fiber optics. An optical fiber is a flexible, transparent fiber made by drawing glass (silica) down to a diameter slightly thicker than that of a human hair. Optical fibers are used most often to transmit light between the two ends of the fiber and are used widely in fiber-optic communications, where they permit transmission over longer distances and at higher bandwidths (data rates) than wire cables. Fibers are used instead of metal wires because signals travel along fibers at high capacity with reduced loss. In addition, fibers are also immune to electromagnetic interference, a problem that plagues metal wires. Fibers are also used for illumination, and are wrapped in bundles so that they may be used to carry images, thus allowing viewing in confined spaces, as in the case of a fiberscope. Specially designed fibers are also used for a variety of other applications, such as fiber optic sensors and fiber lasers.

Optical fibers typically include a transparent core surrounded by a transparent cladding material with a lower index of refraction. Light is kept in the core by the phenomenon of total internal reflection which causes the fiber to act as a waveguide. Fibers that support many propagation paths or transverse modes are called multimode fibers; those that support a single mode are called single-mode fibers. An optical fiber is generally fabricated by heating a prefabricated preform inside a furnace and drawing the preform into the optical fiber. One preform might yield on the order of 7,000 to 8,000 km of optical fiber.

Today, tight optical fiber cutoff wavelength specifications must be met, and yield loss to achieve those specifications is not tolerated. Cutoff wavelength can be defined as the wavelength below which a single mode optical fiber will act as a multimode fiber. Or, in other words, cutoff wavelength can be defined as the wavelength above which single mode operation is ensured in a single mode optical fiber. Many network planners now realize that cable cutoff wavelength is one of the most important parameters to define while preparing an optical fiber cable specification.

Multi-core fiber (MCF) transmission technologies have been widely studied as the simplest form of spacial multiplexing (SM) or space-division multiplexing (SDM) and as an answer to the increasing demand for bandwidth. SDM refers, in fiber optic communication systems, to the use of the transverse dimension of the fiber to separate the channels. MCF technologies contain multiple cores within a single cladding. Each core of the MCF can accommodate a single mode or a number of modes depending on the method of SDM used. Typically, the MCF has four to eight cores but other numbers of cores are possible. If the cores are relatively far apart, their individual modes overlap negligibly, and the multicore fiber behaves as a bundle of single-mode fibers. Mode overlap is not negligible, however, if the cores are closely spaced.

Japanese companies have been especially active in developing MCF technologies. For example, Sumitomo Electric Industries, Ltd. obtained U.S. Pat. No. 9,604,868 (which claims priority to Application No. JP20130030890) titled "Preform Manufacturing Method." The manufacturing method has a hole-forming step of forming a plurality of holes in a glass body to produce a glass pipe, and a heating integration step of heating the glass pipe with core rods including core portions being inserted in the respective holes, thereby to implement integration of the core rods and the glass pipe. In the hole-forming step, a peripheral hole out of the holes to be formed in the glass body is formed at a position determined in consideration of positional variation of the core portion before and after the integration.

Furukawa Electric Co. Ltd. filed Application No. JP20160191693 (issued as Patent No. JP6560178) titled "Method of Manufacturing Multicore Fiber Preform and Method of Manufacturing Multicore Fiber." The patented method of manufacturing a multicore fiber preform includes: preparing a clad preform having a plurality of through holes extending in a longer direction of a columnar glass preform in the glass preform; connecting the cylindrical member to one end part of the clad preform coaxially with the clad preform; and inserting core preforms into the plurality of through holes of the clad preform, respectively. The inner diameter of the cylindrical member is smaller than the diameter of a circumscribed circle of the through hole positioned on an outermost circumferential side among the plurality of through holes formed in the clad preform, and in the preparation process, the clad preform has a communication structure formed to allow the inside of the cylindrical member to communicate with a through hole overlapping with at least a part of the cylindrical member in a top face view among the plurality of through holes.

Although many types of MCFs exist, the most common is the "uncoupled MCF" system in which each individual core is assumed to be an independent optical path. This system permits simultaneous transmission of different signals down different cores. The key issue in this system is how to suppress the inter-core crosstalk and the coupling/de-coupling mechanism. Currently, many MCF varieties, coupling methods, splicing techniques, and transmission schemes have been proposed and demonstrated and despite many of the component technologies still being in the development stage, MCF systems already present the capability for huge transmission capacity.

Crosstalk is the phenomena in the MCF systems in which signals travelling in one core affect propagation of signals travelling in other cores. Upon initial consideration, the use of MCFs with more cores is advantageous due to higher resource availability. The main factor of signal interference in the MCF is, however, the leakage of a fraction of the signal power from a given core to its neighboring cores. This phenomenon, called crosstalk, renders impracticable the allocation of some cores given high interference caused by the neighboring cores. Thus, to enable the application of MCFs with a large number of cores, the development of fibers that provide smaller crosstalk between neighboring cores is required. Reduction of inter-core crosstalk is a major research issue in present day MCF systems. Besides the number of cores, the arrangement of the cores and the fiber physical properties have a strong impact on the crosstalk between the cores.

Coupling losses also remain a critical issue in the design of MCF-based systems. Coupling loss in fiber optics refers to the power loss that occurs when coupling light from one optical device or medium to another. In optical systems, coupling losses can occur where there is a change in index of refraction (most commonly at a fiber/air interface) and a portion of the energy is reflected back into the source component. Another major source of optical coupling loss is geometrical. As an example, two fibers coupled end-to-end may not be precisely aligned, with the result that the two cores do not perfectly overlap. Light exiting the source fiber at a portion of its core that is not aligned with the core of the receiving fiber will not (in general) be coupled into the second fiber. Although some light will be coupled into the second fiber, it is not likely to be efficiently coupled, nor will it generally travel in an appropriate mode in the second fiber. Similarly, even for two perfectly aligned cores, where there is a gap of any significant distance between the two fibers, there will be some geometric loss due to spread of the beam. Some percentage of the light rays exiting the source fiber face will not intersect the second fiber within its entrance cone. The coupling loss is measured in the same units—such as decibels—as in the originating element or medium.

SUMMARY

To solve the problems inherent in conventional MCF preform manufacturing processes, an object of the disclosed process of manufacturing a MCF preform is to meet tight optical fiber cutoff wavelength specifications while minimizing yield loss to achieve those specifications. Another object is to manufacture a preform that minimizes coupling losses. Still another object is to minimize crosstalk in the manufactured MCF. A related object is to provide a process that yields a MCF having large transmission capacity. It is also an object to provide a preform manufacturing process allowing relatively easy and efficient manufacture of a MCF preform in which a plurality of core portions are accurately arranged at predetermined (specified or as-designed) positions. A related object is to manufacture a high precision preform in terms of core sizes and positions. A further object is to achieve precise preform geometry (including low preform bow or curvature and diameter variation) and waveguide properties free of cladding-to-core distortions.

To achieve these and other objects and in view of its purposes, the present disclosure provides a process for manufacturing a MCF preform having a center longitudinal axis, a plurality of core rods each positioned in a respective core hole and extending along the axis, and a common cladding covering each of the plurality of core rods. The process includes the following steps. A cylinder is provided which will form the cladding of the preform and may have a center core hole. Peripheral core holes are created in the cylinder extending along the longitudinal axis. Each of a plurality of core rods is inserted into a respective peripheral core hole. The cylinder with the core rods inserted in the respective core holes is heated by exposing the cylinder and core rods to a heating element of a furnace, thereby integrating the core rods and the cylinder and forming the preform, wherein the position error of the core holes with respect to the diameter of the preform is ≤0.6%.

According to a first operation, the process further includes, after the step of creating the plurality of peripheral core holes and before the step of inserting the core rods, the step of resizing the cylinder. The step of resizing the cylinder includes applying a partial vacuum to the plurality of peripheral core holes and only partially collapsing and stretching the cylinder without the core rods inserted in the core holes to reduce the size of the cylinder proportionally and/or to modify the ratio of the diameter of the cylinder to the diameter of the plurality of peripheral core holes. The step of resizing the cylinder is limited to core hole size changes of about 10% or less.

According to second and third operations, the step of heating the cylinder is performed as part of an upward draw process in which the cylinder is collapsed onto the core rods in the core holes. The upward draw process includes (1) supporting from below both the cylinder and the core rods so that the weight of the cylinder and the core rods is completely supported from below and the core rods do not move longitudinally relative to the cylinder as the cylinder collapses onto the core rods; and (2) moving the cylinder and the core rods upward with respect to the heating element so the cylinder is continuously collapsed onto the core rods while the cylinder and core rods move upward, wherein the differential flow of the cylinder and the core rods along the longitudinal axis due to gravity is minimized.

More specifically, according to the third operation, the upward draw process includes simultaneously stretching the cylinder and core rods while collapsing the cylinder onto the core rods. The third operation also includes, before the step of creating the plurality of peripheral core holes, the step of defining the positions of the plurality of peripheral core holes in the cylinder by considering the positional variation of the core holes before and after the step of heating. The step of creating the plurality of peripheral core holes then includes creating the plurality of peripheral core holes at the defined positions.

It is to be understood that both the foregoing general description and the following detailed description are exemplary, but are not restrictive, of the invention.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

Figure 1:
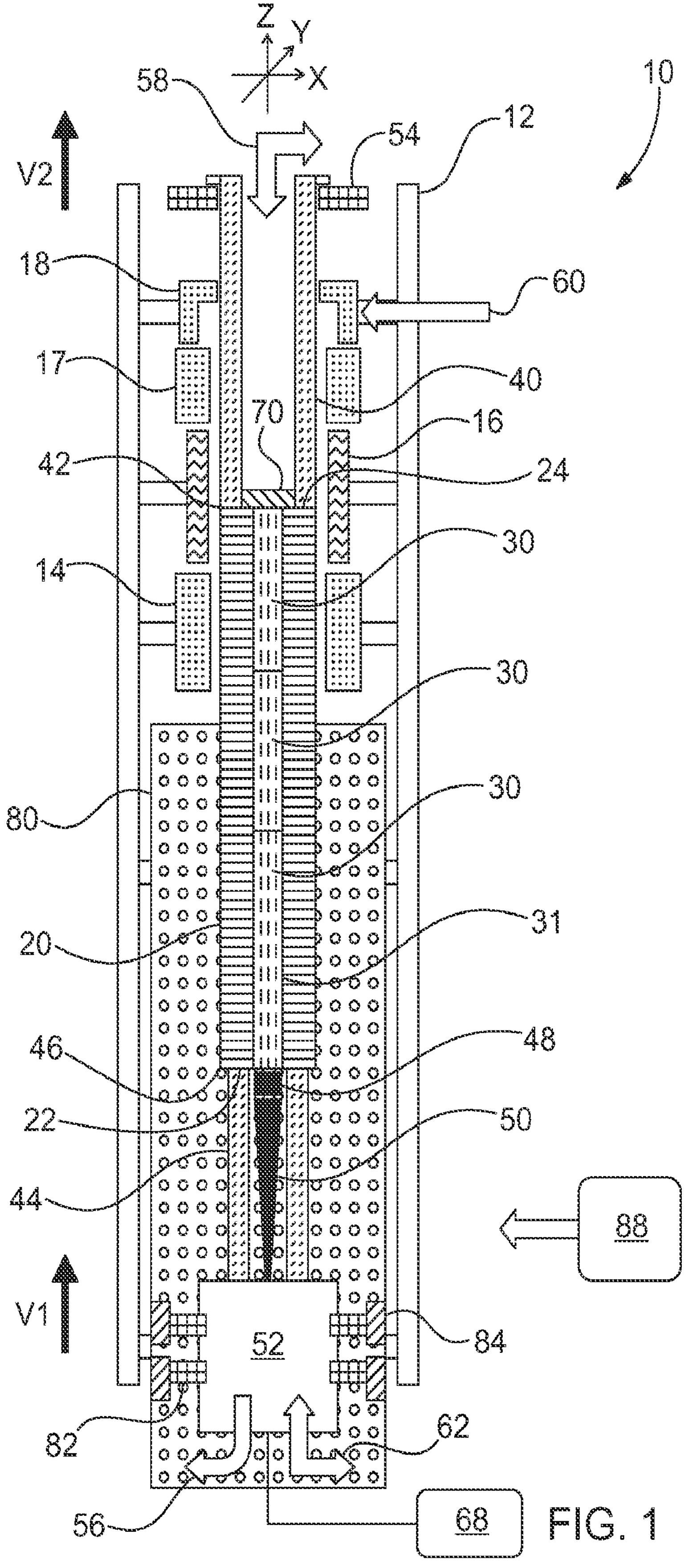
FIG. 1 is a schematic illustrating the main components of the apparatus used in the upward collapse process of forming an elongated component of glass.

In this specification and in the claims that follow, reference will be made to a number of terms which shall be defined to have the following meanings ascribed to them.

"Include," "includes," "including," "have," "has," "having," comprise," "comprises," "comprising," or like terms mean encompassing but not limited to, that is, inclusive and not exclusive.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is described to be about or about equal to a certain number, the value is within +10% of the number. For example, a value that is about 10 refers to a value between 9 and 11, inclusive. When the term "about" is used in describing a value or an end-point of a range, the disclosure should be understood to include the specific value or end-point. Whether or not a numerical value or end-point of a range in the specification recites "about," the numerical value or end-point of a range is intended to include two embodiments: one modified by "about" and one not modified by "about." It will be further understood that the end-points of each of the ranges are significant both in relation to the other end-point and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and processes of the disclosure include those having any value or any combination of the values, specific values, more specific values, and preferred values described.

The indefinite article "a" or "an" and its corresponding definite article "the" as used in this disclosure means at least one, or one or more, unless specified otherwise.

Directional terms as used in this disclosure—for example up, down, right, left, front, back, top, bottom—are made only with reference to the figures as drawn and the coordinate axis provided with those figures and are not intended to imply absolute orientation.

"Contact" refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. "Contacting" refers to placing two elements in direct or indirect contact. Elements in direct (indirect) contact may be said to directly (indirectly) contact each other.

"Optical fiber" refers to a waveguide having a glass portion surrounded by a coating. The glass portion includes a core and a cladding, and is referred to in this disclosure as a "glass fiber." A multi-core fiber is an optical fiber with a glass fiber that includes two or more cores surrounded by a cladding common to the two or more cores. The glass fiber functions as a waveguide.

"Radial position," "radius," or the radial coordinate "r" refers to radial position relative to the centerline (r=0) of a core of the multi-core fiber. Each of the two or more cores of a multi-core fiber has a centerline and a separate radial coordinate r. "Radial position," "radius," or the radial coordinate "R" refers to radial position relative to the centerline (R=0) of the multi-core fiber. The multi-core fiber has a single centerline.

An optical fiber is generally fabricated in two, separate processes. First, a core rod is prepared and then a preform is fabricated by a rod-in-tube (RIT) or rod-in-cylinder (RIC) process, or by another overclad process such as an outside vapor deposition (OVD) process. Second, the fabricated preform is heated inside a furnace and drawn into optical fiber. A conventional process and apparatus for producing the optical fiber preforms, completing the first of the two processes, may include the provision of an optical fiber RIT overclad apparatus.

The overclad apparatus includes a vertical lathe, a chuck installed in each end of the vertical lathe, a carriage in the vertical lathe for vertically moving between both ends of the vertical lathe, an oxygen-hydrogen burner installed in the carriage, a furnace installed in the carriage, a vacuum pump provided at an end of the vertical lathe, a coupler for connecting the vacuum pump to the end of the vertical lathe, and a controller outside the vertical lathe for controlling the vertical movement of the carriage, the flow rate of the oxygen-hydrogen burner, and the rotation of the chucks. The furnace preheats or heats a glass tube to overclad a core rod with the glass tube.

In practice, the outside diameter of the preform is limited to 90 mm or less in the conventional RIT overclad apparatus. That limitation is imposed by inefficient heating by the oxygen-hydrogen burner. Furthermore, a handle must be welded to a single core rod (of the same length as the RIT overclad tube) in order to provide a separate support for the core rod weight from the top end. This results in two disadvantages: (1) waste of core rod material because short core rods cannot be used effectively; and (2) welding of the handle to the core rod, especially with an oxygen-hydrogen torch, results in surface hydroxide (OH) incorporation on the surface of the core rod which if not etched away (an additional cost for the process) can increase fiber attenuation particularly at 1,383 nm due to OH absorption.

More recently, preforms for quartz glass tubing, rods, or collapsed offline rod-in-cylinders (ORICs) have been produced by introducing a quartz glass component (e.g., a cylinder, an ingot, or an uncollapsed RIC) into an apparatus including a heating zone (e.g., a furnace) in a vertical orientation such that the lower end begins to soften and form a strand. The strand is then placed in a pulling device including one or more sets of pulling wheels. The rate of draw of the strand is controlled by the speed of the pulling wheels, which may apply either a downward or an upward force depending on the forming zone temperature or the viscosity and the weight of the strand supported by the wheels. Forming is accomplished without the aid of a die. Thus, the strand dimensions are controlled by the feed rate of the quartz glass component, the temperature of the heating zone, and the speed of the pulling wheels.

With the conventional ORIC process, a cylinder (typically 3 m long with an outside diameter of about 200 mm) made of synthetic, high-purity glass is collapsed onto a high-purity glass core rod to form an optical fiber preform with heat and vacuum at the interface gap. The preform is usually drawn downward continuously with a diameter significantly smaller than the original diameter of the cylinder. Sufficient vacuum must be applied to the gap between the cylinder and core rod to facilitate interface collapse as well as to support the weight of the core rod through the softened glass.

Vacuum is essential to prevent core rod movement with respect to the cylinder; otherwise, the cladding-to-core ratio of the resulting preforms will be distorted and fibers drawn from them will fail to meet the required waveguide specifications (such as the cutoff wavelength). Complicated and expensive preform outside diameter measurements and feedback controls are also needed in the downward collapse, stretch, and draw process and, even with such controls, it is difficult to achieve precise preform geometry (including low preform bow or curvature and diameter variation) and waveguide properties free of cladding-to-core distortions. This inherent waveguide distortion effect in the downward draw process is in large part due to the gravitational and vacuum forces acting on the molten glass and the unattached core rod in the furnace where the outer cladding glass, being hotter, flows downward faster than the inner core rod glass.

There is a significant difficulty in producing the largest preforms with outside diameters close to the original cylinder or cladding size with the conventional downward draw systems and processes. A significant amount of good preform glass is wasted at the start-up and at the end of the process where the geometry and waveguide properties of the preform are far from required specifications in terms of such parameters as geometry, clad-to-core ratio, core eccentricity and bow. Thus, the conventional preform systems and processes have distinct drawbacks.

According to U.S. Patent Application Publication No. 2018/0145752, an apparatus and upward collapse process are provided that yield a preform with the largest outside diameter and length known to exist (namely, an outside diameter of about 200 mm, where conventional outside diameters are limited to about 150 mm, and a length of about 3 m, or about the same size as the original cylinder or cladding) with almost no waveguide (clad-to-core) distortion and at significantly reduced waste and cost. Conventional optical fiber preforms have an outer diameter of 90 to 150 mm. In the streamlined upward collapse process, the stacked core rods in the ORIC cladding are supported from below (so the core rods do not move relative to the cladding in the collapse process) and the whole ORIC assembly moves up with respect to the furnace so the preform is continuously collapsed and drawn upward as illustrated in FIG. 1 and described below. The apparatus and upward collapse process: (1) produce the largest known preform because they can be made in a collapse-only process with the largest known overclad cylinder, (2) reduce cost because of nearly 100% overclad and finished (tipped) preform yield (nearly no waste) and a streamlined and simplified (e.g., no need for on-line measurement or feedback controls) process including an integrated online preform tipping process (a saving of processing time and a heating step), (3) improve waveguide quality because of the inherently low waveguide (cladding-to-core) distortion with fixed, stacked, and supported core rods of variable and arbitrary lengths, and (4) allow reactive gas (such as $SF_6$) to be applied to the interface up to about one atmosphere (i.e., no need for vacuum) for improved interface and lower core rod D/d ratio (interface closer to the waveguide core).

The D/d ratio for the core rod is the ratio of the outside diameter of the core rod to the diameter of the waveguide core (where light propagates), where "D" is the outside diameter of the core rod and "d" is the diameter of the waveguide core. The ratio is very important to those who use RIT or RIC preforms to produce optical fibers in defining core capacity expansion. As the D/d ratio of the core rod decreases, the interface gets closer to the waveguide core and this means the relative amount of glass needed in the core rod decreases (while the amount of glass in the cladding needs to increase). This in turn means that with the same core rod manufacturing facility its capacity for making core rod (or equivalent capacity for optical fiber core) scales roughly as the square of D/d (e.g., a doubling of core capacity by reducing the D/d from 3.3 to 2.3). Reducing core rod D/d presents a significant challenge, however, to the overclad material purity and interface quality because of the exponentially increasing optical power propagation there. Thus, a more aggressive gas etching, cleaning, and drying process at the interface (with $SF_6$ for example) would be needed at lower core rod D/d. In short, a lower D/d ratio (i.e., the interface is closer to the core) allows manufacturers of the preform to (a) expand core capacity easily without expensive investment, and (b) realize more complex and advanced optical fiber designs with refractive index features closer to the core.

Referring to FIG. 1, there is shown an apparatus 10 for producing an optical fiber preform. The apparatus 10 includes a vertically arranged frame 12. From bottom to top, the frame 12 has a lower open end; a pre-heating or lower insulation zone 14; a heating zone 16; a post-heating or upper insulation zone 17; a post-heating cooling, annealing, and oven gas purging zone 18; and an upper open end opposing the lower open end. The heating zone 16 can preferably be heated to temperatures of about 500° C. to 2,300° C., and more preferably about 1,000° C. to 2,300° C., and still most preferably about 1,500° C. to 2,300° C., by a heating element (typically an oven or furnace). More particularly, the heating element is preferably of an annular configuration. The heating element is preferably positioned within or around the frame 12 so as to form the heating zone 16 of the frame 12. An inert gas is injected into the heating element at a high temperature to prevent oxidation of the heating element.

Figure 2:
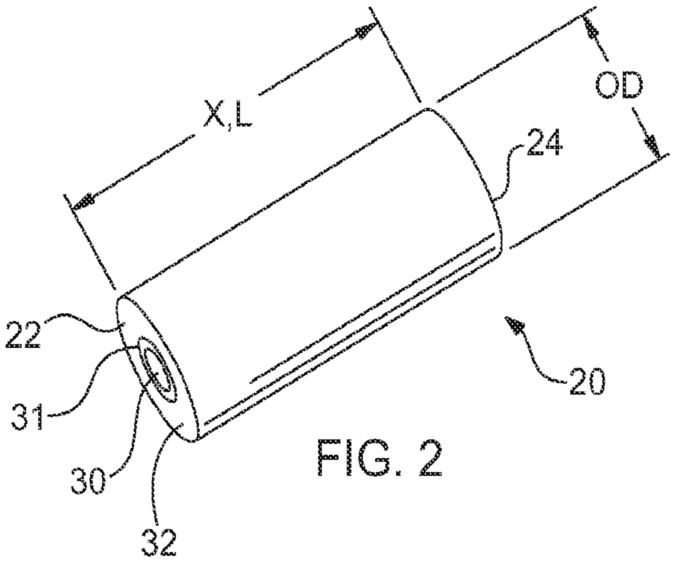
FIG. 2 is a perspective side view of a glass body used to produce an optical component.

Referring to FIG. 2, a glass body 20 is used to produce optical fiber preforms. The glass body 20 is of a cylindrical or tubular configuration. The glass body 20 has a length L which extends from a first or upper end 22 to an opposing second or lower end 24. A longitudinal axis X extends between the opposing first and second ends 22, 24. Preferably, both the first and second ends 22, 24 of the glass body 20 are square cut ends.

The glass body 20 is preferably comprised of a glass core or core rod 30 containing the waveguiding optical fiber core and a glass cladding 32 surrounding the core rod 30. More particularly, the core rod 30 is preferably formed in the geometric center of the glass body 20 and extends along the length L of the glass body 20. The cladding 32 is preferably formed over the core rod 30 to radially surround the core rod 30 along the length L of the glass body 20. The cladding 32 surrounds the core rod 30 in a coaxial arrangement aligned along a common center line. A gap 31 exists initially between the core rod 30 and the cladding 32. The cladding 32 has an outside diameter "OD."

The cladding 32 may be pure quartz glass or a doped quartz glass. Preferably, however, the cladding 32 is of the highest purity synthetic silica whether it is un-doped or doped (e.g., with Fluorine). The core rod 30 is preferably a mostly high purity quartz glass with doped and un-doped regions to achieve the appropriate refractive index profile. The cladding 32 and the core rod 30 may each be formed by any suitable process, such as fused quartz or one or more types of chemical vapor deposition (CVD), including inside vapor deposition, outside vapor deposition, and vapor axial deposition. The core material at the center of the core rod 30 typically has a refractive index which is greater than the refractive index of the material in the surrounding cladding 32 to enable internal reflection of light signals passing through a fiber drawn from the preform, resulting in an effective waveguide.

Returning to FIG. 1, a first or top collar 40 is affixed to the top of the cladding 32. Although other mechanisms can be used to affix the top collar 40 to the cladding 32, a top weld 42 is suitable. The outside diameter of the top collar 40 is approximately the same as or smaller than the outside diameter of the cladding 32. A second or bottom collar 44 is affixed to the bottom of the cladding 32. Although other mechanisms can be used to affix the bottom collar 44 to the cladding 32, a bottom weld 46 is suitable. The outside diameter of the bottom collar 44 is either smaller than or approximately the same as the outside diameter of the cladding 32. The top collar 40 and the bottom collar 44 are both hollow, tube-like components.

The stacked core rods 30 are positioned inside the cladding 32 and rest on top of an optional short spacer 48 which, in turn, rests on top of a long spacer 50. The long spacer 50 is supported by a bottom collar holder and vacuum unit 52 located below the long spacer 50. The bottom collar holder and vacuum unit 52 also holds, as its name implies, and supports the bottom collar 44. The rod-in-cylinder or RIC assembly (which includes the stacked core rods 30 and the cladding 32 of the glass body 20, along with the top collar 40 and the bottom collar 44 affixed to the cladding 32) and the bottom collar holder and vacuum unit 52 are loaded first onto a top collar holder and vacuum unit 54 located above the oven gas purging zone 18. (The bottom collar holder and vacuum unit 52 and the top collar holder and vacuum unit 54 allow the apparatus 10 to either remove gas from, i.e., create a vacuum, or introduce gas to the apparatus 10 at either end of the apparatus 10. The top collar holder and vacuum unit 54 holds, as its name implies, and supports the top collar 40.) Then the glass body 20 is positioned with respect to the heating zone 16 and, more particularly, to the heating element of the heating zone 16 and moved upwardly through the heating element. The bottom collar holder and vacuum unit 52 is gripped and supported below the heating zone 16; the top collar holder and vacuum unit 54 is gripped and supported above the heating zone 16. Before the heating step starts, the top weld 42 (and, therefore, the top of the cladding 32) is initially placed a predetermined distance below the center of the heating element to avoid thermal shock to the top weld 42. (By "predetermined" is meant determined beforehand, so that the predetermined characteristic must be determined, i.e., chosen or at least known, in advance of some event.) For example, this distance may be about 350 mm.

The upward collapse process of manufacturing a preform using the apparatus 10 is explained with reference to FIG. 1. The glass body 20 is passed through the frame 12, where it is heated, softened, and elongated to form an optical component, such as an optical fiber preform. More particularly, the lower end 24 of the glass body 20 is preferably positioned in a stable manner in the frame 12 at the start of the process and the glass body 20 then progresses in an upward (i.e., opposite the conventional downward) direction through the frame 12. In the frame 12, the glass body 20 is heated in a zone-wise manner in the heating zone 16. A preform is continuously created by melt deformation to collapse the overclad gap 31 and fuse the core rods 30 to the overclad cylinder or cladding 32 (and optionally the preform can be stretched/elongated or shortened/compressed by either pulling or compressing forces applied by the top collar holder and vacuum unit 54 and the bottom collar holder and vacuum unit 52 during the process).

In one embodiment, the glass body 20 is a coaxial assembly of two separate glass components: the stacked core rods 30 and the cladding 32. More particularly, the core rods 30 are in the form of a solid, cylindrical rod and the cladding 32 is in the form of a hollow overclad cylinder surrounding the stacked core rods 30 (i.e., a rod-in-cylinder assembly). In the coaxial assembly, the stacked core rods 30 and the cladding 32 are not fused together before the glass assembly enters the heating zone 16.

As the coaxial assembly of this embodiment of the glass body 20 progresses upward through the frame 12, the core rods 30 and the cladding 32 are heated to a predetermined temperature and time sufficient to cause the two glass components to soften and fuse together to form an integral and consolidated glass body 20. By "integral" is meant a single piece or a single unitary part that is complete by itself without additional pieces, i.e., the part is of one monolithic piece formed as a unit with another part.) More particularly, as successive portions of the two-piece glass body 20 approach the heating zone 16 and are heated in the heating zone 16, the cladding 32 and the core rods 30 become softened and the softened cladding 32 collapses on and fuses with the core rods 30. At least one, and more preferably a plurality of "ready-to-draw" preforms may then be drawn directly into fiber from the resulting monolithic glass body 20.

Preferably, the coaxial arrangement of this embodiment of the glass body 20 is heated to temperatures of about 500° C. to 2,300° C., and more preferably about 1,000° C. to 2,300° C., and most preferably about 1,500° C.-2,300° C. More preferably, softening and collapsing of the cladding 32 on the core rod 30 occurs at a temperature of about 1,000° C. to 2,200° C., and more preferably about 1,300° C. to 2,000° C., and most preferably about 1,600° C. to 1,800° C. Fusing together of the softened and collapsed cladding 32 with the softened core rod 30 preferably occurs at a temperature of about 1,000° C. to 2,200° C., and more preferably about 1,300° C. to 2,200° C., and most preferably about 1,600° C. to 2,200° C. Those skilled in the art will understand, however, that other factors, such as glass material composition and throughput also affect the temperature at which the cladding 32 will collapse on and fuse with the core rods 30.

The fused interface between the core rods 30 and the cladding 32 is assured to be clean by several components of the apparatus 10. For example, the bottom collar holder and vacuum unit 52 and the top collar holder and vacuum unit 54, which are both sealed, permit the upward collapse process to operate in a vacuum. The bottom collar holder and vacuum unit 52 and the top collar holder and vacuum unit 54 also isolate the preform assembly (particularly the interface) from potential contaminants in the heating element (e.g., furnace) and the outside environment. The furnace and the outside environment are typical sources of contamination for conventional processes, especially during the vacuum initiation process where the ingress of contaminants into the interface is difficult to avoid. In addition, a reactive interface treatment gas can be used to etch, clean, and dry the interface.

A typical recipe used to heat up the heating element of the heating zone 16 is about 50 kW for 30 minutes, about 100 kW for 10 minutes, about 150 kW for 10 minutes, about 200 kW for 10 minutes, about 220 kW (or somewhat lower maximum power, for example 212 kW) into the steady-state of the process. The bottom collar holder and vacuum unit 52 located at the bottom of the apparatus 10 moves at a velocity V1, while the top collar holder and vacuum unit 54 located at the top of the apparatus 10 moves at a velocity V2. Typically, at the start of the process V1=V2. In a typical recipe, V1=V2=about 13.5 mm/minute for 6 minutes after 100 kW is reached for 2 minutes. Then the assembly is stopped for about 4 minutes. After the 4 minute pause, the assembly moves up again at about 13.5 mm/minute until the top weld 42 reaches the center of the heating element. Once the top weld 42 reaches the center of the heating element, the assembly is stopped for about 6 minutes. Then the assembly is moved up again at V1=V2 for steady state collapse.

When the top weld 42 is about 110 mm to about 135 mm above the center of the heating zone 16, the vacuum pump of the bottom collar holder and vacuum unit 52 is activated (i.e., turned on). Such activation draws a vacuum in the direction of arrow 56 and causes the pressure in the top collar 40 to start decreasing. When the pressure in the top collar 40 stops decreasing, the top of the cladding 32 will have collapsed, the gap 31 will have closed, and the cladding 32 will have sealed or fused with the core rod 30. At this moment, the vacuum keeps pumping at the bottom collar holder and vacuum unit 52 while back filling gas (e.g., nitrogen gas $N_2$) to the top collar 40 until the pressure reaches about 1 atm. Then the top collar 40 is connected to air.

The vacuum pump of the top collar holder and vacuum unit 54 can be activated (i.e., turned on) to draw a vacuum in the direction of arrow 58. Similarly, a purging of the gas (typically an inert gas such as argon, helium, or, most typically, nitrogen) used in the heating element of the heating zone 16 can be achieved by introducing gas into the heating element in the direction of arrow 60. The gas purging occurs between the outer surface of the glass body 20 and the surface of the heating element, to prevent soot generation on the outer surface of the glass body 20 and oxidization of the heating element. The gas purging at the top of the heating element is typically on from the beginning of the process. It is important to identify a proper purging rate (about 9 $m^3/h$, for example) so that no soot or other deposits are formed on the surface of the preform during or after the process.

When the bottom weld 46 is a predetermined distance below the center of the heating zone 16 (for example, about 500 mm), the power of the heating element starts to decrease linearly. When the bottom weld 46 reaches the center of the heating zone 16, the power of the heating element should be at a predetermined ending power value (for example, about 150 kW to about 160 kW). While maintaining this ending power, the assembly should still keep moving up for a short distance (for example, about 50 mm). This process step suppresses the end phase temperature rise and avoids overheating and slumping of the glass near the bottom.

When the bottom weld 46 is a short distance above the center of the heating element (for example, about 50 mm), the process is complete. At this position, power to the heating element is turned off completely and assembly movement is stopped at the same time. The vacuum pumping can be maintained for a short period of time (for example, about 1 to 2 minutes) after the process stops to guarantee the complete collapse of the cladding 32 to the lower end 24 of the glass body 20. Maintaining the vacuum is not necessary if the end phase heating recipe is 100% correct, however, and maintaining the vacuum for extra time may also carry the risk of deforming the bottom collar 44.

A load cell 68 is used to measure the total weight being supported by the bottom collar 44. If a slight constant oscillation perturbation is superimposed onto the velocity V2 of the top collar and vacuum unit 54 and the velocity V1 of the bottom collar holder and vacuum unit 52 is kept constant, "ripples" appear on the load cell reading curve. The bigger the amplitude of the "ripple," the colder the process. This is because with a colder process, the softened glass at the center of the heating element is more rigid and more able to translate the force of the oscillation to the bottom of the assembly. With constant heating element power settings, this information indicates whether the process is on the slightly hotter side or slightly colder side due to the actual condition of the heating element. Based on this knowledge, one can determine the ending power of the process, i.e., the colder the process, the higher the ending power needs to be. This "ripple" amplitude is basically a true viscosity measurement of the glass body 20 at the center of the heating element, which is much more reliable than any glass surface temperature measurement with a pyrometer.

Thus, the apparatus 10 and related upward collapse process permit viscosity measurements of the glass body 20 at the center of the heating element by imposing an oscillating movement. A small oscillation is imposed onto the position at the top of the preform assembly. In parallel the weight of the preform assembly is measured by the load cell 68. The measurement of the load cell 68 provides an indirect measurement of the viscosity of the glass body 20 at the center of the heating element. This information can be used to control the temperature/heating power of the heating zone 16 using, for example, a controller 88 (discussed below).

As a distinct difference from the conventional downward draw processes, the stacked core rods 30 are supported by the spacer 48 at the bottom of the stacked core rods 30 instead of being supported by a vacuum, essentially fixing the position of the core rods 30 with respect to the cladding 32 during the overclad and draw process. In other words, the upward collapse process does not require a vacuum to prevent core rod movement which can result in cladding-to-core waveguide distortion and therefore a fiber cutoff wavelength problem. Furthermore, in contrast to the conventional downward draw process, the weight of glass both above and below the molten glass in the heating zone 16 is well supported by the top collar 40 and the bottom collar 44 in the upward draw process, which essentially eliminates the cladding-to-core waveguide distorting effects conventionally caused in the heating zone 16 by gravitational and vacuum forces. This difference allows the upward collapse process to be much more tolerant when a heating element or collapse temperature runs on the cold side (because the glass does not have be softened sufficiently to translate a pressure difference from the vacuum and support the core rods 30).

The upward collapse process also allows a partial pressure in the gap 31 between the core rods 30 and cladding 32 (up to atmospheric pressure or a little more, typically about 1,100 mbar) because there is no need for vacuum to support the weight of the core rods 30. Therefore, a reactive interface treatment gas such as sulfur hexafluoride ($SF_6$, which is safe to handle at room temperature) can be freely applied during the high-temperature collapse in the direction of interface treatment gas arrow 62 to etch away any potential interface contamination such as metallic particles or surface hydroxide (OH). In addition to sulfur hexafluoride, other suitable reactive interface treatment gases include oxygen ($O_2$), chlorine ($Cl_2$) although safety concerns would arise, fluorine ($F_2$), nitrogen trifluoride ($NF_3$), silicon tetrafluoride ($SiF_4$), carbon tetrafluoride ($CF_4$), and fluoroform ($CHF_3$). Use of a reactive interface treatment gas to etch, clean, and dry the preform interface yields an improved interface, an enhanced optical fiber quality (reduced fiber breaks, bubbles, loss, or airlines), and the ability to lower the core rod D/d ratio.

As mentioned in the previous paragraph, the upward collapse process is much less vulnerable to differential core-cladding glass flow or waveguide distortion effects because the stacked core rods 30 are supported from below by the spacer 48 and the weight of the glass both above and below the heating zone 16 (where the glass is softened) is also supported. Such support eliminates the problem of uncontrolled glass flow and distortion. Therefore, there is a natural advantage of processing low viscosity glass material (such as heavily F-doped cladding 32) without risking cladding-to-core waveguide distortion from excess heating or from gravitational and vacuum forces. This provides an important processing advantage for a certain class of fiber designs with F-doped cladding 32 materials.

Returning to FIG. 1, a glass disk 70 with an outside diameter slightly smaller (i.e., typically about 126 mm) than the inside diameter of the top collar 40 is placed on top of the core rods 30 and the cladding 32 and inside the top collar 40. The disk 70 may be about 5 cm thick. During the start-up of the process, after the 6 minutes dwell time of the top weld 42 at the center of the heating element, a vacuum is applied from both the bottom collar holder and vacuum unit 52 and the top collar holder and vacuum unit 54. The vacuum collapses the top collar 40 onto the disk 70. By setting V2>V1, a tip is pulled on top of the cladding 32 before the steady-state collapse of the rest of the cladding 32 where V2=V1. The result is a low-cost and high-yield online preform tipping process, which yields preforms that are easiest and most efficient for subsequent fiber draw. The integrated online preform tipping process saves substantial amounts of both effort and cost (e.g., saves an extra heating step) over the conventional offline tipping process.

If V2 is set to be higher than V1 when the interface collapse has been initiated and continues, the upward collapse process can also stretch or draw upward a preform with a diameter significantly smaller than the original diameter of the cladding 32. The diameter of the stretched (or even compressed) preform can be accurately controlled by the precise settings of linear vertical speeds V1 and V2 through the law of conservation of mass. The start-up loss of good preform glass is much less for the upward collapse process, however, than for the conventional downward draw process and it can therefore result in a significant cost saving for the stretched preforms.

The upward collapse process is also a completely contact-free process for the finished preform because the weight of glass both above and below the heating zone 16 (where the glass is softened) is supported by the top collar 40 and the bottom collar 44 while the outer surface of the preform itself is untouched. Avoidance of preform contact and therefore any lateral or transverse force results in both a very clean preform surface and a preform with very little bow, unlike in the conventional downward draw process where puller wheels are always in contact with, and apply force to, the preform throughout the process.

In many conventional downward draw processes, small contact areas exist between the puller wheels and the preform circumference. Such contact can introduce impurities or contaminants on the preform surface. In addition, puller wheels can assert lateral force in the downward draw process causing preform bow (which becomes exacerbated for longer preforms, i.e., bow increases as the square of the preform length for the simple curvature case). The amount of contact force that can be applied to the preform by the puller wheels is limited because excessive pressure can damage the glass surface of the preform. Therefore, for large preforms that require a greater pulling force than can be applied by a single set of puller wheels, multiple sets of puller wheels may be applied to the preform at different levels to achieve the necessary total vertical (frictional) force to support preform weight. But multiple sets of puller wheels increase both apparatus height and cost. Further, low bow in the preform can only be achieved with multiple sets of puller wheels if the sets of puller wheels are precisely aligned, which is difficult to achieve in practice. The contact-free upward collapse process yields a preform with very little bow due to the lack of any lateral forces applied to the preform.

Returning again to FIG. 1, the apparatus 10 may optionally include a gripper system 80 attached to the frame 12. A suitable gripper system 80 is described more fully in U.S. Pat. No. 10,590,022, which claims priority to International Patent Application No. PCT/US2015/012471, titled "Formation Of Elongated Glass Components With Low Bow Using A Gripper Device" and filed on Jan. 22, 2015 by an assignee of the subject application, Heraeus Quarzglas GmbH & Co. KG. In one embodiment, the gripper system 80 is included with the apparatus 10 by attaching the gripper system 80 to the frame 12.

The gripper system 80 includes clamping elements 82 and mounting elements 84 attaching the clamping elements 82 to the gripper system 80. The gripper system 80 may move vertically parallel to the length of the frame 12 (defined in FIG. 1 as the Z direction). The mounting elements 84 allow translational movement of the clamping elements 82 in the X direction and the Y direction (i.e., to any position within the X-Y plane). (Although neither necessary nor preferred, a chuck system may also be used that allows rotation—especially if a torch, rather than a furnace, were to provide the heating element.) In one embodiment, the mounting elements 84 are X-Y tables including a pair of arms mounted on linear bearings or linear rails and a motor, for example a manual or servo motor drive, to control movement of the arms. The mounting elements 84 are further low-friction devices, so that a force applied to the clamping elements 82 by an external object will result in the clamping elements 82 being deflected along the mounting elements 84 rather than the clamping elements 82 applying a resistive force to the external object.

Once the preform has formed, the gripper system 80 may be attached by moving the clamping elements 82 into contact with the bottom collar 44 or (as shown in FIG. 1) the bottom collar holder and vacuum unit 52. The clamping elements 82 preferably should not contact the preform. The clamping elements 82 may be sized to have convex regions having the opposite shape of the bottom collar 44, so that the clamping elements 82 fit securely around the bottom collar 44 without causing damage to the bottom collar 44. The clamping elements 82 may contact all or (as shown in FIG. 1) only a portion of the outside surface of the bottom collar 44 or the bottom collar holder and vacuum unit 52. In an exemplary embodiment, the clamping elements 82 may be made of a high temperature compressible material such as calcium silicate, asbestos, compressed glass, or ceramic fibers (e.g., rock wool) or high temperature rubber (e.g., silicone or fluoropolymer elastomers).

The clamping elements 82 are first aligned with the center of the bottom collar 44 or the bottom collar holder and vacuum unit 52 by determining the center of the bottom collar 44 or the bottom collar holder and vacuum unit 52 and then moving the clamping elements 82 into alignment with the center in the X direction. In some embodiments, the clamping elements 82 may be aligned to an estimated center of the bottom collar 44 or the bottom collar holder and vacuum unit 52, for example the expected center based on the desired travel path. In other embodiments, in order to more accurately align the clamping elements 82 with the bottom collar 44 or the bottom collar holder and vacuum unit 52, the apparatus 10 may further include a sensing element capable of locating the center of the bottom collar 44 or the bottom collar holder and vacuum unit 52 and a computer for determining the center from the output of the sensing element. The sensing element may include one or more laser devices, a camera/vision system, or a mechanical contact (dial indicator) system. In an exemplary embodiment, the sensing element may be attached to the gripper system 80 or may be external to the gripper system 80, for example attached to the frame 12. In another embodiment, the sensing element may be external to both the gripper system 80 and the frame 12, for example cameras. Because the gripper system 80 includes further elements to prevent misalignment, it is not necessary for the gripper system 80 to perfectly align with the center of the bottom collar 44 or the bottom collar holder and vacuum unit 52.

Once the clamping elements 82 are aligned, the clamping elements 82 are brought into contact with the bottom collar 44 or the bottom collar holder and vacuum unit 52 by movement of the mounting elements 84 in the X direction. The mounting elements 84 may be moved by any suitable mechanism, for example a motor used to control the pair of arms of an X-Y table. Because the mounting elements 84 are low-friction devices, if the clamping elements 82 attempt to attach to the bottom collar 44 or the bottom collar holder and vacuum unit 52 while not properly aligned with the center, the force of the bottom collar 44 or the bottom collar holder and vacuum unit 52 pushing against the clamping elements 82 will move the clamping elements 82 into an aligned position instead of the bottom collar 44 or the bottom collar holder and vacuum unit 52 being moved. The mounting elements 84 may further include a locking mechanism that may be engaged and disengaged to prevent movement of the clamping elements 82 once the clamping elements 82 are attached to the bottom collar 44 or the bottom collar holder and vacuum unit 52. While the clamping elements 82 are being moved into position, the locking mechanism is unlocked, so that the clamping elements 82 may be moved by the motor while still being displaced by any additional force applied to the clamping elements 82. Once the clamping elements 82 are in contact with the bottom collar 44 or the bottom collar holder and vacuum unit 52, the locking mechanism is engaged to prevent further movement of the clamping elements 82 in the X-Y plane.

To detect misalignment, in one embodiment the gripper system 80 further includes a force sensing device, such as load cells, to sense and measure the reaction force that occurs during the process of the clamping elements 82 attaching to the bottom collar 44 or the bottom collar holder and vacuum unit 52. Load cells are transducers that convert a force applied to the clamping elements 82 to a strain gauge (not shown) of each load cell into an electrical signal. The electrical signal may then be measured and correlated to the force applied to the strain gauge. Exemplary load cells include hydraulic load cells, pneumatic load cells, and strain gauge load cells. Should the clamping elements 82 not be properly aligned with the center of the bottom collar 44 or the bottom collar holder and vacuum unit 52, the reaction force will be greater than if the clamping elements 82 are properly aligned. By measuring the reaction force with the force sensing device, misalignment may be detected and corrected before the clamping elements 82 apply a force to the bottom collar 44 or the bottom collar holder and vacuum unit 52 sufficient to result in movement of the bottom collar 44 or the bottom collar holder and vacuum unit 52. In one embodiment, the force sensing device may be used in conjunction with the low-friction mounting elements 84, where the speed at which the clamping elements 82 are attached to the bottom collar 44 or the bottom collar holder and vacuum unit 52 is slowed in response to a greater-than-expected reaction force in order to allow the clamping elements 82 to move on the mounting elements 84 into an aligned position. In an exemplary embodiment, the clamping elements 82 may be moved toward the bottom collar 44 or the bottom collar holder and vacuum unit 52 at a rate ranging from approximately 50 mm/minute to approximately 100 mm/minute while no misalignment is detected by the force sensing device, and the rate reduced to approximately 10 mm/minute to approximately 25 mm/minute if misalignment is detected. In other applications, the clamping speeds may exceed these ranges.

In summary, the gripper system 80 helps to support the preform assembly weight (which may be about 350 kg or more), replacing the conventional full-contact puller wheel system. The gripper system 80 permits floating positioning of the glass body 20 used to make the preform in the horizontal (X-Y) plane and precision linear movement in the vertical (Z) direction for exact alignment and control of preform geometry and the preform tipping process. Especially when the gripper system 80 is incorporated, the apparatus 10 avoids lateral or transverse forces on the preform, thereby minimizing and perhaps eliminating preform bow; can monitor glass behavior during heating using a load cell; and permits the use of physics (conservation of mass) to control dimensions precisely (eliminating the expense of conventional online measurements and feedback controls).

In addition, the apparatus 10 and related upward collapse process can be used in combination with a preform measurement device. A suitable preform measurement device is described more fully in U.S. Pat. No. 10,378,996, which claims priority to International Patent Application No. PCT/US2014/050368, titled "Methods And Apparatus For Determining Geometric Properties Of Optical Fiber Preforms" and filed on Aug. 8, 2014 by an assignee of the subject application.

A controller is a hardware device or a software program that manages or directs the flow of data (i.e., facilitates communication) between two components. The apparatus 10 includes a controller 88. The controller 88 provides the ability to obtain data from, for example, the load cell 68, the gripper system 80; the top and bottom collar holder and vacuum units 52, 54; and the vacuum and treatment gas systems, and to use that data to control the other components of the apparatus 10 and the related upward collapse process. The controller 88 has programmed in it, in a manner well-known to those skilled in the art, a preset control program or routine to assure efficiently the optimum heating and movement process recipe. More specifically, the controller 88 can define, for example, the velocities V1 and V2, the flow rates of gases, and the pressure of the vacuum pumps. The controller 88 helps to assure a robust and reproducible "one button" automated process for production.

An important advantage of the upward collapse process is minimization, perhaps elimination, of waveguide (cladding-to-core) distortion. Sources of waveguide distortion are the gravitational and vacuum forces on the core rod and molten glass inherent in conventional processes and eliminated by the upward collapse process. Waveguide distortion is a problem that is rarely, if ever, addressed in the RIT/RIC field. The lack of problem recognition may be because past optical fiber performance requirements were much less stringent, so the field tended to treat optical preforms just like a simple glass rod without worrying about the actual waveguide (cladding-to-core) distortion effect which can result, for example and among other things, in fiber cutoff wavelength failure.

World-wide connected devices, cloud services, 5G (5th generation mobile networks or 5th generation wireless systems, which denotes a major phase of mobile telecommunications standards), and Industry 4.0 (or the fourth industrial revolution, the current trend of automation and data exchange in manufacturing technologies including cyber-physical systems, the Internet of things, and cloud computing), and other advances are driving an exponentially increasing demand for bandwidth. Therefore, optical fiber manufacturers must increase their output and productivity. For next generation optical fiber manufacturing, very large preforms drawn at high speeds are required. The result of the upward collapse process is a "ready-to-draw" solid preform that can sustain multiple days of uninterrupted optical fiber draw, increasing the productivity and optical fiber output as well as reducing the cost and realizing improved fiber yield for users of the preform.

The upward collapse process naturally includes the upward draw (and, optionally, stretch or compression) as well as the low-cost upward online tipping by collapsing the top collar 40 or the bottom collar 44 and by matching the outside diameter of the top collar 40 to the outside diameter of the cladding 32. These additional features of the upward collapse process can be done much more accurately and cheaply than for the conventional downward draw process via the exact physics of conservation of mass and glass flow. The upward collapse process, including the draw/stretch and tip features, can also achieve a nearly 100% tipped preform yield with minimal waveguide distortion at the preform end (i.e., more "good" glass). It is also worth pointing out that, with the upward collapse process, the good preform glass yield is nearly 100% without the wasteful sacrificial starting material used for the start-up of the conventional downward draw process. And the consumption of the material used for the top collar 40 and the bottom collar 44 is also minimal in the upward collapse process.

A single overclad upward collapse process is described above. This process can be applied, however, to multiple overclad "gap" jacket tubes or cylinders with trivial modifications, such as increasing the outside diameter of the spacer 48 and slightly adjusting the maximum heating power and ending power. Furthermore, the upward collapse process is also capable of accommodating double (or even triple or more) length cladding 32 with the distinct advantage of no need for cladding inside diameter matching (i.e., a smaller inside diameter for the bottom cladding to support the core rods inside the top cladding, as in the case of the conventional downward draw process) because the weight of the stacked core rods 30 is completely supported from below. The single or multiple overclad upward collapse process can also be applied to manufacture MCFs.

Figure 3:
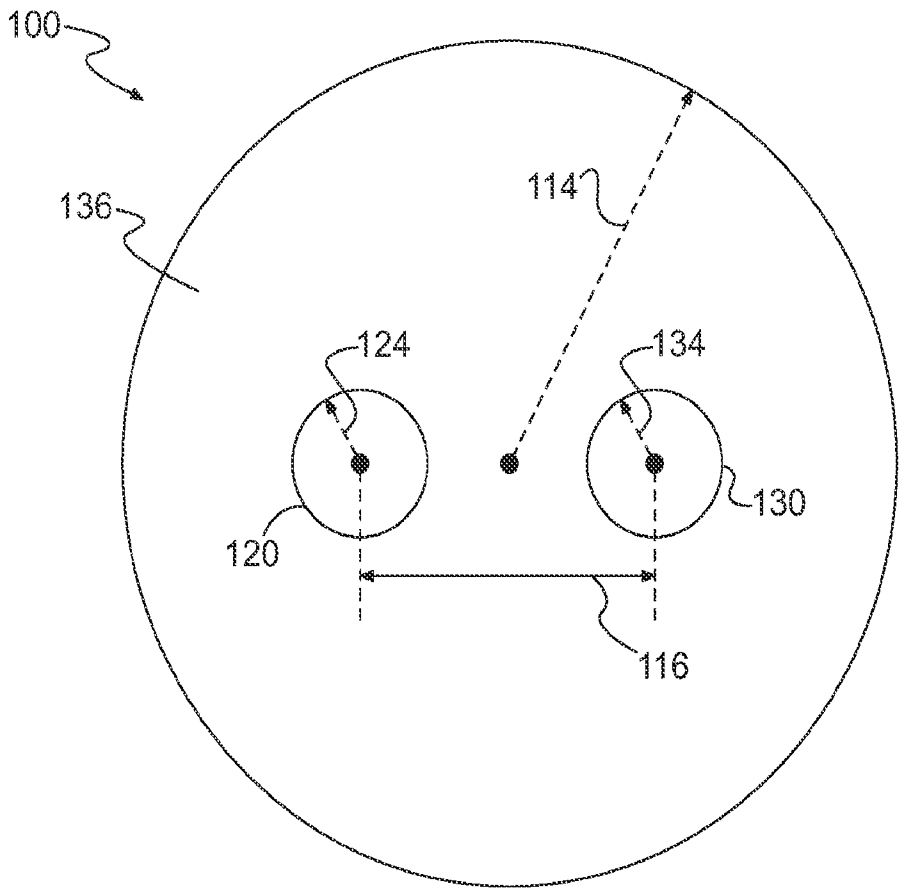
FIG. 3 depicts a cross-section of a multicore glass fiber having two core regions and a common outer cladding region.

MCFs are used for telecommunications and fiber sensors. FIG. 3 illustrates a multi-core fiber 100 with two cores. In each core, a core region is directly adjacent to a common outer cladding region. A first core includes a core region 120 and a common outer cladding 136. The core region 120 has a radius $r_1$ depicted at 124. A second core includes a core region 130 and the common outer cladding 136. The core region 130 has a radius $r_2$ depicted at 134. The common outer cladding region 136 has a radius R depicted at 114 and the spacing between the centerlines of the core regions 120 and 130 is depicted at 116. The distance or spacing 116 between the two neighboring cores 120, 130 is also called core pitch. Core pitch defines the crosstalk between the neighboring cores 120, 130. By altering the core pitch, the crosstalk between the neighboring cores 120, 130 can be changed.

MCFs can be categorized into homogeneous and heterogeneous MCFs. In a homogeneous MCF, all cores are identical to each other and core-to-core distance dominates the core density of the MCF, which in turn ensures acceptable crosstalk levels along a propagation length. In the case of heterogeneous MCFs, all of the cores are not identical to each other, as it is a well-known fact that the maximum power transferred between cores goes down significantly if the cores have differences between their core radii. Therefore, in the case of heterogeneous MCFs, non-identical cores are arranged such that crosstalk between any pair of cores is small and cores are more efficiently packed as compared to homogeneous MCFs.

A distinction can be made between three different manufacturing processes used to create an MCF. Each of the three processes is described below in turn.

In the "stack-and-draw" process, the individual cores and filler rods are stacked hexagonally and melted together in a cladding tube under vacuum and at the same time stretched or drawn into the fiber. The stack-and-draw process is the subject of EP1002249A1 (Corning Inc.) and EP 2320256 A1 (Furukawa Co. Ltd.). The advantage with this process is that the process is fast and needs no additional mechanical processing. The disadvantages are the reduced design variety (hexagonal packing) and the expected higher crosstalk and optical losses due to scattering (high number of distorted internal interfaces). Volume scaling is also difficult to implement with the stack-and-draw process.

The second process is the grain-in-tube process (also called the powder-in-tube or sand process). The sand process is the subject of JP2019081681A (Furukawa Co Ltd.) and JP 5995298 B1 (Nippon Telegraph and Telephone Corporation). The individual cores are positioned in a jacket tube according to the design specifications and the remaining cavity is filled with quartz glass powder. It is very difficult to master the geometric positioning accuracy of the cores on the one hand and the generation of a defect-free cladding on the other hand using the sand process.

The third process (the drilling process) involves a cladding cylinder which is drilled according to desired design specifications without restrictions and whose holes are then filled with core rods. In subsequent steps, the cylinder is collapsed onto the core rods and then (optionally) stretched to the appropriate size or drawn directly to the fiber. The collapse and stretch steps can also be done in one step. The elimination of surface defects and geometric artifacts is a challenge in the direct fiber draw step of the drilling process.

Suppression of inter-core crosstalk (XT) is crucial to transmit signals individually through each core of the MCF. The desired maximum XT is −25 dB. From the geometric aspect of the fiber composition, essential factors are the absolute radial and azimuthal positions of the cores and their variations along the fiber. Therefore, manufacturing of a high precision preform, in terms of core sizes and positions, is highly desired. The disclosed process is able to make precisely machined MCF cylinders and establish a robust over-cladding process fusing the MCF cylinder and core rods to form the preform with great precision. The drilling process used to make an MCF cylinder is currently the most promising process for producing high-precision multi-core fibers with the greatest potential for volume scaling. In this disclosure, the largest cylinder bodies (with diameters up to about 250 mm) are machined so that with the same absolute machining precision the greatest precision in MCF core positions can be achieved for the final MCF preform or fiber.

To minimize the waveguide (cladding-to-core) distortion in the preform-making process, the process incorporates upward draw process steps (as described above) so that the differential axial flow of the cladding and core glass due to gravity is minimized. One important aspect of achieving the precise (radial/azimuthal) core position is to account for the effect of the overclad gaps between the core rods and drilled holes in the cylinder during the preform-making process. A quantitative estimate is provided in the examples below together with some insights using finite element modeling (FEM). With FEM, the possibility can be considered of partially collapsing and stretching a larger holey cylinder in a precise way to reshape it into a more convenient but smaller size with minimal undesired distortions.

Even though an improvement of MCF cylinder hole size/position accuracy can be achieved by advanced drilling technology (e.g., magnetic guidance of the drilling head), the efforts are extensive and the cost is prohibitive for large scale production. The practical absolute deviation of the drilled hole with a diameter between about 20 mm and 43 mm is 0.3 mm on a 1.5 m long glass rod. For the fabrication of a cladding cylinder for MCF, the position error of the drilled holes with respect to the diameter of the preform is required to be no larger than 0.6%, more preferably no larger than 0.4%, and still more preferably no larger than 0.2%. Therefore, with the same absolute drilling accuracy, it is of great advantage to use the largest outside diameter (OD) cylinder bodies to reduce the relative error. Using the disclosed process, cylinders can be made with an OD ranging from about 150 mm to 250 mm. Hence, the achievable relative error varies between 0.3/150=0.2% and 0.3/250=0.12%, which is equal to or below the maximum acceptable relative error of 0.2%.

The disclosed process begins by providing a glass cylinder (which will form the cladding of the preform) having an OD ranging from about 150 mm to 250 mm. The relatively large size of the cylinder makes it easier to drill holes in the cylinder precisely; errors in the hole positions are less a percentage of the OD size for larger cylinders. The glass cylinder may be solid or may have a center hole (the center hole will exist if a mandrel was used to make the glass cylinder). The peripheral or side holes (which will receive core rods) are created (e.g., drilled) in the cylinder carefully and with great precision.

Unfortunately, problems are encountered when drilling the holes in the cylinder. Different MCF designs require a large variety of different hole sizes. The drilling equipment is expensive, however, so that providing a sufficient number of drill sizes to meet all design requirements is costly (in some cases, prohibitively so). Flexibility is needed with respect to hole size during the drilling step.

Once the drilled cylinder is obtained, the next step in the disclosed process is to make a preform with a drilled MCF cylinder having a hole position/size relative error that is ≤about 0.6%, more preferably ≤about 0.4%, and still more preferably ≤about 0.2%. This step is accomplished by implementing one or more of three different operations (individually or, in some applications, sequentially) during the disclosed process. Each operation is described in turn below.

In the first operation, an MCF cylinder having drilled core holes is provided and MCF cylinder resizing is accomplished without significant geometric/shape distortion. This operation essentially adjusts the hole geometry and position that might be imposed by the limited drilling and honing tool sizes in the machining steps. Such adjustment is accomplished by partially collapsing and/or stretching the MCF cylinder without core rods but with a partial vacuum in the holes to reduce the size of the MCF cylinder proportionally and/or modify the ratio of the cylinder diameter to the diameter of the holes. This operation provides the added flexibility of adapting the MCF cylinder to core rods with ODs much smaller than the diameter of the drilled holes before the preform-making process. From another perspective, this step also provides a viable path to reach much smaller holes in the MCF cylinder while maintaining the same relative positioning error, which can be challenging to produce by the method of mechanical drilling only.

The first operation can be completed using either the conventional downward draw process or the upward collapse process described above. The partial collapse and/or stretch operation allows the process to replicate the use of different drill sizes using a single drill size. Specifically, one drill size can be used to drill the holes in the cylinder and then the partial collapse and/or stretch operation can be applied in different amounts to yield holes of different sizes—achieving the same result as if drills of different sizes were used instead. Thus, the partial collapse and/or stretch operation lends flexibility to the process of making the preform. Of course, this operation may be unnecessary if the drilling step works well and the holes are drilled in the cylinder precisely where needed and in the size or sizes required.

In the MCF preform, the deformation of glass in the vicinity of the core rods during the heating step is not symmetrical as to the core portions (i.e., the core holes) located off the central axis of the preform. This is because the glass cylinder or cladding deforms faster in the outside region closer to the heat source than in its center region. As a result, the centers of the holes do not coincide with the centers of the core portions after the heating step. For this reason, it is difficult to arrange the core portions located off the preform central axis accurately at specified or as-designed positions.

When the clearance or gap is too large between an inner wall surface of each hole of the glass cylinder and an outer peripheral surface of the core rod, the positional deviation of the core portion will tend to increase in the MCF preform. As long as the clearance is small, the positional deviation of the core portion after the heating step can be kept small. When the clearance is too small, however, it becomes difficult to insert the core rod into the hole of the glass cylinder. In addition, the inner wall surface of the hole of the glass cylinder or the outer peripheral surface of the core rod is likely to be scratched during insertion of the core rod into the hole, and this scratch may cause undesirable bubbles or the like to generate at the interface.

In the second operation, the core rods are inserted into the core holes and the MCF cylinder is collapsed onto the core rods inside the drilled holes to make a preform. No stretching is involved in this operation. The precision of different geometric features (such as ovality, bow, siding, eccentricity, and hole positions) from the MCF cylinder can be maintained to the maximum extent in the final preform using this full collapse without stretch operation. The OD of the preform is limited, however, to be slightly smaller than the OD of the MCF cylinder (given the absence of stretching).

In the third operation, which is preferred, the MCF cylinder with the core rods inside the drilled holes is collapsed and stretched while heated to make a preform. This full collapse and stretch operation offers great flexibility and enables the production of a range of preform ODs which can be adapted to the fiber manufacturer's draw capability. (Typically, the preform is later drawn into an optical fiber.) The stretching step reduces the OD of the cylinder. The step of forming the holes in the MCF cylinder is configured to form the peripheral holes at positions predetermined after considering the positional variation of the core portions before and after the step of heating the core rods and the glass cylinder. As a result, the operation allows easy manufacture of the MCF preform in which the plurality of core portions are accurately arranged at predetermined, specified, as-designed positions.

Examples

The following examples are included to more clearly demonstrate the overall nature of the invention. These examples are exemplary, not restrictive, of the invention. FEM is used to develop the examples via simulation.

For the first operation, the pure resizing process can be accomplished using a conventional downward draw, similar to a regular proportional tube draw process where the outside diameter to insider diameter (OD/ID) ratio is controlled by the draw process. If the pressure in the holes of the MCF cylinder is the same as the pressure outside the MCF cylinder during the draw, the resulting smaller OD MCF cylinder will have the same cylinder diameter to hole diameter ratio as the original cylinder. On the other hand, for the resizing process, an under-pressure in the holes can be used to assist the radial collapse (which is orthogonal to the axial stretch if there is any), in order to increase the ratio of the cylinder diameter to the diameter of the holes. Similarly, an over-pressure in the holes can be used to expand the holes and decrease the ratio of the cylinder diameter to the diameter of the holes.

Figure 4:
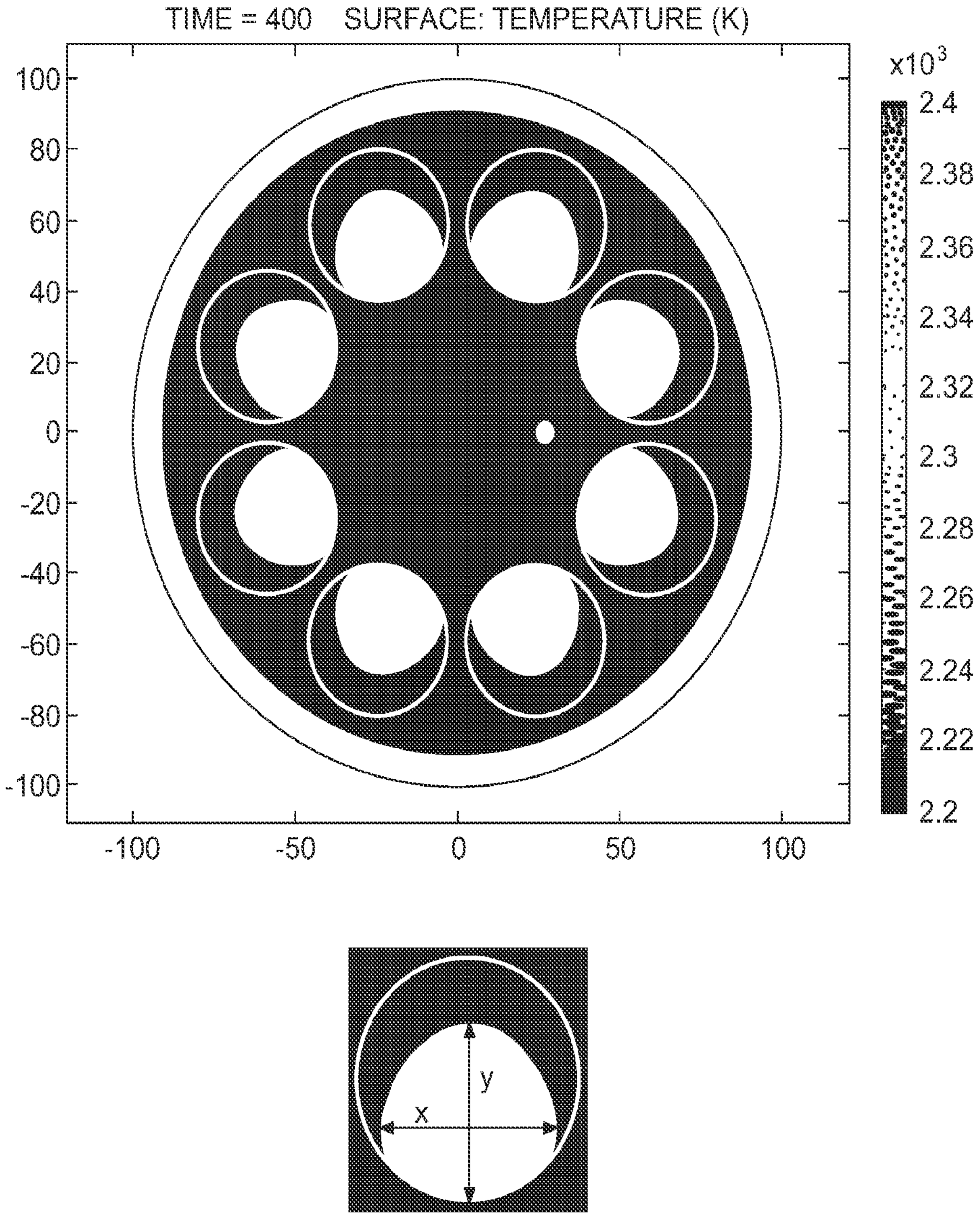
FIG. 4 is FEM simulation of a pure radial glass collapse during a process step of the disclosed process.

FEM simulations for such a radial collapse process step have been performed. One example simulation is shown in FIG. 4, which depicts FEM of a pure radial glass collapse. The whole deformation ((x−y)/x) for the simulated case is about 10%. With a relatively large size change of the hole, the hole deforms significantly from the precisely machined circular shape (and such significant deformation is not desired). Therefore, the radial collapse resizing achieved by the partial collapse and/or stretch operation is not practical for large changes in the size of the holes. The operation is limited to hole size changes of about 10% or less.

For the second and third operations, an upward draw process must be used to minimize the waveguide (cladding-to-core) distortion. In this RIC process, the free-moving and free-standing core rods are conveniently stacked and supported from the cylinder bottom; the radial collapse and axial stretch are orthogonal to each other, providing full and precise control of the glass flows both radially and axially. Any desired preform OD could be achieved with a minimal distortion in the cladding-to-core waveguide ratio and the highest precision in the radial/azimuthal core positions.

Figure 5:
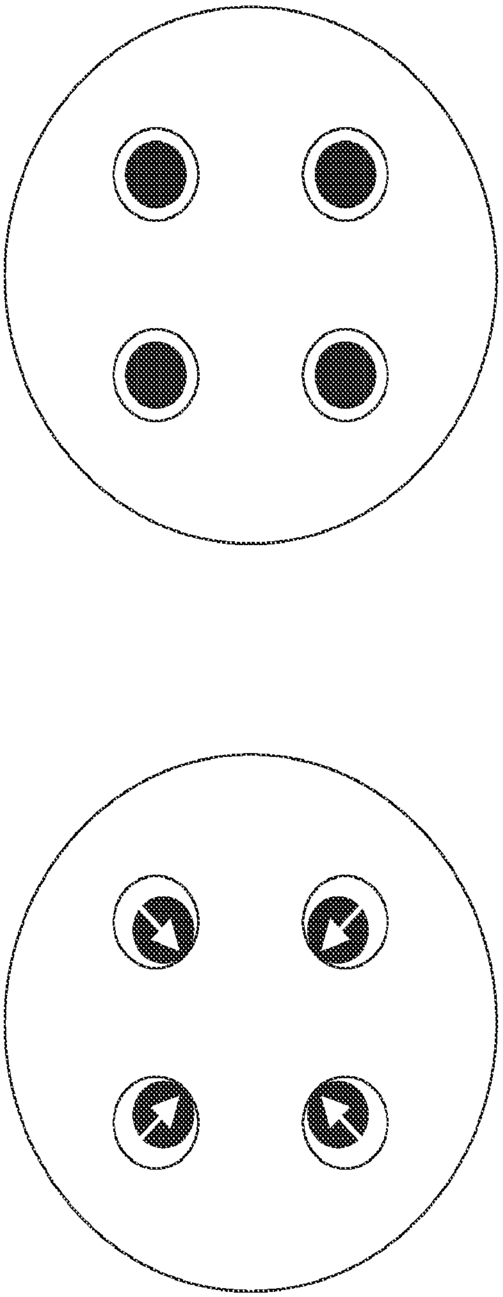
FIG. 5 is a schematic illustrating how core rods move toward the center of the MCF cylinder during the radial collapse.

In these upward draw process steps, the essentially free-moving core rods will be pushed (i.e., they will move) toward the geometric center of the MCF cylinder by the in-flow of the glass during the collapse process of the holey RIC cylinder onto the core rods. Such movement is simulated in FIG. 5. This phenomenon is due to the inner edges of the holes having essentially no freedom to move radially toward the MCF cylinder center while the outer edges of the holes can collapse and move radially toward the center of the MCF cylinder as there is free space between the core rod and ID of the holes. This phenomenon has also been demonstrated in the simulation for the resizing process above (FIG. 4), where clearly the outer edges of the holes move toward the center of the cylinder while the inside edges almost stay still.

The disclosed full collapse and stretch operation recognizes, and takes into account, the phenomenon that core rods will move toward the geometric center of the MCF cylinder during the upward draw collapse process. A key is to predetermine such movement before the operation begins. With knowledge of that movement, the initial positions of the core holes are created (e.g., drilled) where necessary so that, after movement of the core rods in the holes during the operation, the positions of the core rods in the final preform will be as specified or designed. To calculate the radial core rod movements, the following parameters must be considered:

- D=Distance from the hole center to the cylinder center before thermal processing (heating, collapsing, and stretching);
- R=Original hole radius;
- $\alpha$=Original or initial MCF overclad cylinder diameter before collapsing and stretching;
- $\beta$=Diameter of the final preform or fiber;
- r=Original core rod radius;
- r'=Core rod radius after stretching, which can be calculated as equal to $(\beta/\alpha)\times r$ to a high degree of accuracy;
- d'=Distance of the peripheral or side core hole center to the cladding center after stretching if there is no center hole and core rod; and
- d"=Distance of the peripheral or side core hole center to the cladding center after stretching if there is a center hole and core rod of the same dimensions as the side core rods and holes.

The following inequality holds for the case of no center hole and core rod:

$$(D/\alpha)-(d'/\beta)\leq(R/\alpha)-(r'/\beta). \qquad \text{(Equation 1)}$$

So, the distance (d') of the peripheral or side core hole center to the MCF center after collapsing and stretching if there is no center hole and core rod can be calculated by Equation (2):

$$d'\geq(\beta/\alpha)\times(D-R+r). \qquad \text{(Equation 2)}$$

For the case of a central hole and core rod of the same dimensions as the side core rods and holes there will be an additional shift of the side core holes toward the MCF center and, to a high degree of accuracy, this distance (d") of the peripheral or side core hole center to the MCF center after collapsing and stretching is:

$$d''\geq(\beta/\alpha)\times[D-(R-r)\times(1+R/D)]. \qquad \text{(Equation 3)}$$

Figure 6:
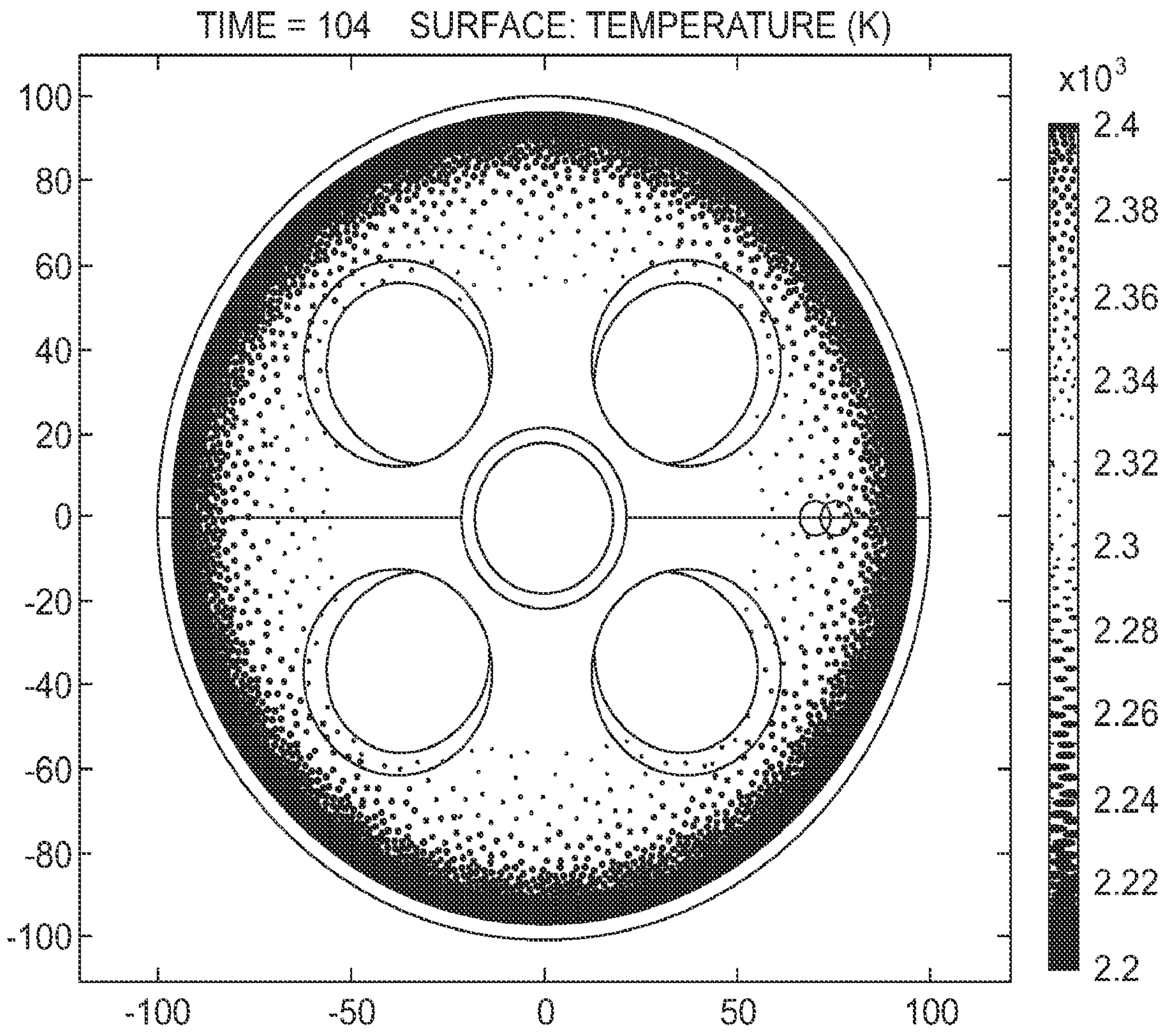
FIG. 6 illustrates an example of the evolution of the shape and displacement of the side and center holes without core rods inside.

FEM has been used to understand and verify the complex glass flow in the MCF preform collapse and draw process. In particular, an example of the evolution of the shape and displacement of the side and center holes without core rods inside is shown in FIG. 6; the effects of geometric asymmetry can also be clearly observed.

It is also important to realize that the process step of MCF cylinder collapse alone (without stretching, as in the second of the three operations described above) with core rods in the drilled holes can tolerate a large radial temperature gradient between the cylinder and the core rods. In such an operation, as long as the cylinder has been heated up and softened sufficiently, a successful collapse can be achieved with a designed cladding-to-core ratio in the final preform. On the other hand, for the operation of collapsing and stretching the MCF cylinder with the core rods in the drilled holes (i.e., the third operation discussed above), a relatively small radial temperature gradient between the cylinder and core rods is required to maintain the designed cladding-to-core ratio during the stretch. A large radial temperature gradient or viscosity difference between the cylinder and core rods will result in differential axial movement between the core rod and the overclad cylinder, which destroys the designed cladding-to-core ratio. Therefore, a lower throughput in the upward draw process is needed to allow enough time for the heat to penetrate into the core rod so that the core rod can be softened and stretched. This is especially true and desired if the core rod and the cylinder glass are doped significantly differently and therefore have a large intrinsic viscosity difference even under the same temperature.

This manufacturing process as disclosed above is both reproducible and precise as well as cost and time efficient for industrial-scaled multi-core preforms and fibers. The production of MCF preforms and fibers for telecommunication applications is intended.

The foregoing description of preferred embodiments should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims. It is expressly intended, for example, that all ranges broadly recited in this document include within their scope all narrower ranges which fall within the broader ranges. It is also expressly intended that, as is understood by those skilled in the art, certain steps included in the process may be omitted; certain additional steps may be added; and the order of the steps may be altered from the specific order described.

What is claimed:

1. A process for manufacturing a multicore optical fiber preform having a center longitudinal axis, a plurality of core rods each being positioned in a respective peripheral core hole and extending along the longitudinal axis, and a common cladding covering each of the plurality of core rods, the process comprising the steps of:

providing a cylinder which will form the cladding of the preform, the cylinder having no center core hole;

creating a plurality of peripheral core holes in the cylinder extending along the longitudinal axis;

inserting each of a plurality of core rods into a respective peripheral core hole of the cylinder;

heating the cylinder with the plurality of core rods inserted in the respective peripheral core holes by exposing the cylinder and core rods to a heating element, thereby integrating the plurality of core rods and the cylinder and forming the preform; and before the step of creating the plurality of peripheral core holes, a step of defining positions of the plurality of peripheral core holes in the cylinder by considering a positional variation of the plurality of peripheral core holes before and after the step of heating, and wherein the step of creating the plurality of peripheral core holes includes creating the plurality of peripheral core holes at the defined positions, wherein a position error of the plurality of peripheral core holes with respect to a diameter of the preform is no larger than 0.6%, wherein the step of heating the cylinder is performed as part of an upward draw process in which the cylinder is collapsed onto the core rods in the peripheral core holes, the upward draw process including:

supporting from below both the cylinder and the core rods so that the weight of the cylinder and the core rods is completely supported from below and the core rods do not move longitudinally relative to the cylinder as the cylinder collapses onto the core rods, and moving the cylinder and the core rods upward with respect to the heating element so the cylinder is continuously collapsed onto the core rods while the cylinder and core rods move upward, wherein a differential flow of the cylinder and the core rods along the longitudinal axis due to gravity is minimized, wherein the upward draw process includes simultaneously stretching the cylinder and core rods while collapsing the cylinder onto the core rods, and wherein the step of defining positions of the plurality of peripheral core holes in the cylinder by considering a positional variation comprises:

a structure parameter after the heating step, B is defined as a final diameter of the preform, structure parameters before the heating step, a is defined as an original diameter of the cylinder, r is defined as an original radius of one of the plurality of core rods, R is defined as an original radius of one of the plurality of peripheral core holes into which the respective one of the core rods is to be inserted, and D is defined as a distance between a center of the respective one of the peripheral core holes and the central longitudinal axis of the cylinder, and the defined positions are defined such that the distance (d') from each peripheral hole center to a center of the preform after collapsing and stretching satisfies the following relation: $d' \geq (\beta/\alpha) \times (D-R+r)$.

2. The process according to claim 1 wherein the cylinder has an outside diameter ranging from about 150 mm to 250 mm.

3. The process according to claim 1 wherein the step of creating the plurality of peripheral core holes includes drilling the plurality of peripheral core holes.

4. The process according to claim 1 further comprising, after the step of creating the plurality of peripheral core holes and before the step of inserting the core rods, a step of resizing the cylinder.

5. The process according to claim 4 wherein the step of resizing the cylinder includes applying a partial vacuum or pressure to the plurality of peripheral core holes and only partially collapsing or expanding and stretching the cylinder without the core rods inserted in the peripheral core holes to reduce the size of the cylinder proportionally and/or to modify the ratio of a diameter of the cylinder to a diameter of the plurality of peripheral core holes.

6. The process according to claim 4 wherein the step of resizing the cylinder is limited to size changes of the plurality of peripheral core holes of about 10% or less relative to the resized cylinder.

7. A process for manufacturing a multicore optical fiber preform having a center longitudinal axis, a plurality of core rods each being positioned in a respective peripheral core hole and extending along the longitudinal axis, and a common cladding covering each of the plurality of core rods, the process comprising the steps of:

providing a cylinder which will form the cladding of the preform, the cylinder having a center core hole;

creating a plurality of peripheral core holes in the cylinder extending along the longitudinal axis;

inserting each of a plurality of core rods into a respective peripheral core hole of the cylinder and a center core rod into the center core hole;

heating the cylinder with the plurality of core rods inserted in the respective peripheral core holes by exposing the cylinder and core rods to a heating element, thereby integrating the plurality of core rods and the cylinder and forming the preform; and before the step of creating the plurality of peripheral core holes, a step of defining positions of the plurality of peripheral core holes in the cylinder by considering a positional variation of the plurality of peripheral core holes before and after the step of heating, and wherein the step of creating the plurality of peripheral core holes includes creating the plurality of peripheral core holes at the defined positions, wherein a position error of the plurality of peripheral core holes with respect to a diameter of the preform is no larger than 0.6%, wherein the step of heating the cylinder is performed as part of an upward draw process in which the cylinder is collapsed onto the core rods in the peripheral core holes, the upward draw process including:

supporting from below both the cylinder and the core rods so that the weight of the cylinder and the core rods is completely supported from below and the core rods do not move longitudinally relative to the cylinder as the cylinder collapses onto the core rods, and moving the cylinder and the core rods upward with respect to the heating element so the cylinder is continuously collapsed onto the core rods while the cylinder and core rods move upward, wherein a differential flow of the cylinder and the core rods along the longitudinal axis due to gravity is minimized, wherein the upward draw process includes simultaneously stretching the cylinder and core rods while collapsing the cylinder onto the core rods, and wherein the step of defining positions of the plurality of peripheral core holes in the cylinder by considering a positional variation comprises:

a structure parameter after the heating step, β is defined as a final diameter of the preform, structure parameters before the heating step, a is defined as an original diameter of the cylinder, r is defined as an original radius of one of the plurality of core rods, R is defined as an original radius of one of the plurality of peripheral core holes into which the respective one of the core rods is to be inserted, and D is defined as a distance between a center of the respective one of the peripheral core holes and the central longitudinal axis of the cylinder, and the defined positions are defined such that the distance (d") from each peripheral core hole center to a center of the preform after collapsing and stretching satisfies the following relation: $d'' \geq (\beta/\alpha) \times [D-(R-r) \times (1+R/D)]$.

8. The process according to claim 7 wherein the cylinder has an outside diameter ranging from about 150 mm to 250 mm.

9. The process according to claim 7 wherein the step of creating the plurality of peripheral core holes includes drilling the plurality of peripheral core holes.

10. The process according to claim 1 further comprising, after the step of creating the plurality of peripheral core holes and before the step of inserting the core rods, a step of resizing the cylinder.

11. The process according to claim 10 wherein the step of resizing the cylinder includes applying a partial vacuum or pressure to the plurality of peripheral core holes and only partially collapsing or expanding and stretching the cylinder without the core rods inserted in the peripheral core holes to reduce the size of the cylinder proportionally and/or to modify the ratio of a diameter of the cylinder to a diameter of the plurality of peripheral core holes.

12. The process according to claim 10 wherein the step of resizing the cylinder is limited to size changes of the plurality of peripheral core holes of about 10% or less relative to the resized cylinder.

* * * * *